United States Patent [19]
Shockley

[11] 3,750,760
[45] Aug. 7, 1973

[54] DUAL ACTION GARDENING IMPLEMENT

[76] Inventor: Phillip B. Shockley, 1765 N. Puente Ave. - Sp. 39, Baldwin Park, Calif.

[22] Filed: Nov. 29, 1971

[21] Appl. No.: 202,830

[52] U.S. Cl.................. 172/374, 30/299, 30/321
[51] Int. Cl............................................ A01b 1/00
[58] Field of Search............ 172/371–381, 698, 720

[56] References Cited
UNITED STATES PATENTS

| | | | |
|---|---|---|---|
| 397,735 | 2/1889 | Mansfield | 172/720 X |
| 1,896,568 | 2/1933 | Ammons | 172/375 X |
| 2,737,101 | 3/1956 | Hutchins | 172/380 X |
| 713,866 | 11/1902 | Fenn | 172/698 X |
| 1,017,048 | 2/1912 | Glatt | 172/698 |

*Primary Examiner*—Robert E. Pulfrey
*Assistant Examiner*—R. T. Rader
*Attorney*—Boniard I. Brown

[57] ABSTRACT

A gardening implement comprising a handle mounting at its lower end front and rear blades with front and rear cutting edges. At least the rear blade is hinged to rock up and down and is provided with adjustment screws to adjustably limit the rocking angle of the rear blade and secure the rear blade against rocking in a selected angular position, in a manner such that the blades may be moved back and forth across the ground surface to cut weeds and the like during both the front and back strokes, and the rear blade may swing down to dig into the ground during the back strokes.

11 Claims, 4 Drawing Figures

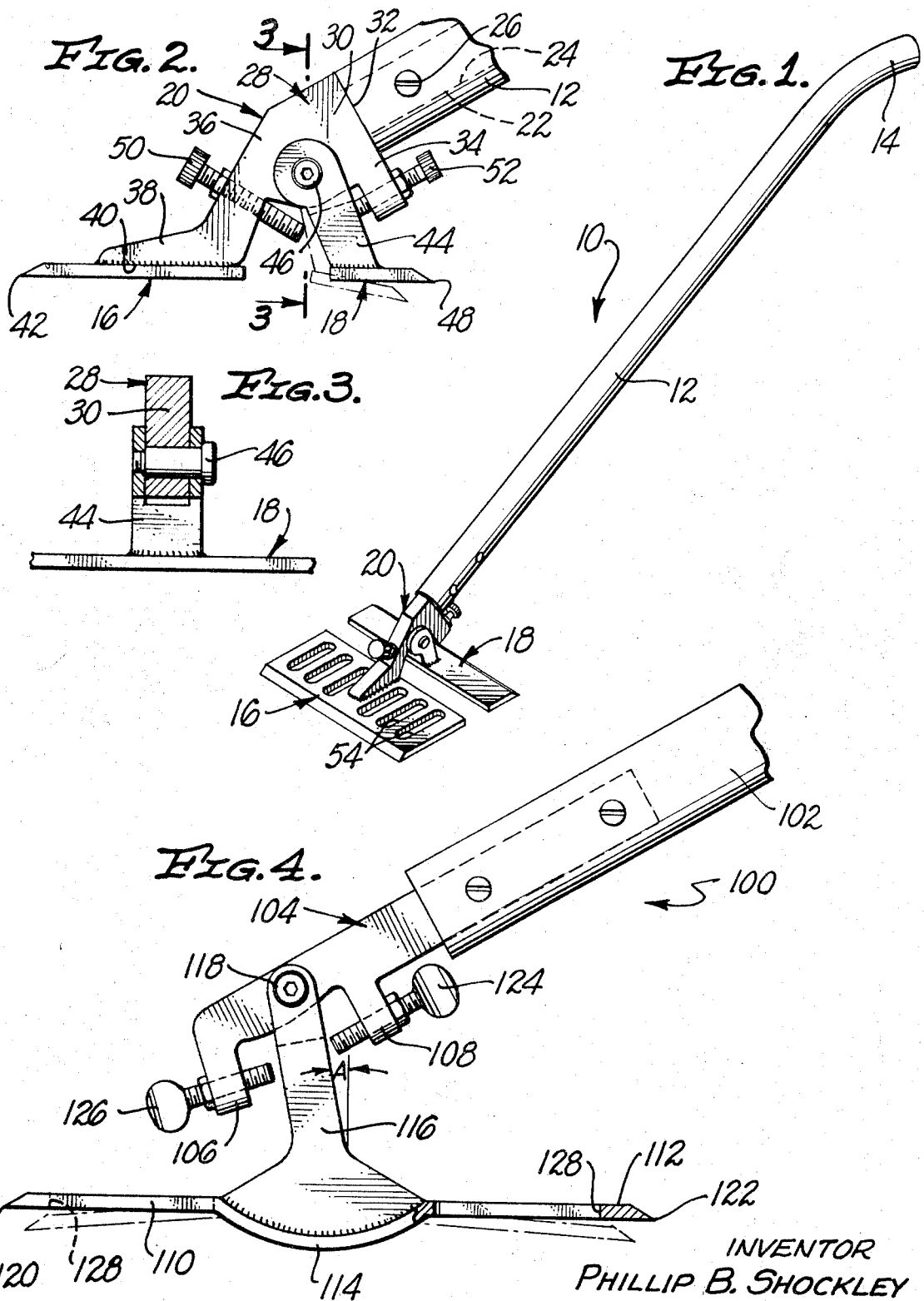

DUAL ACTION GARDENING IMPLEMENT

BACKGROUND OF THE INVENTION

1. Field of the Invention

This invention relates generally to gardening implements and more particularly to a novel dual action gardening implement for cutting weeds and the like and cultivating the soil.

2. Prior Art

Broadly speaking, the gardening implement of the invention may be classified as a hoe-type implement which is useful for both cutting weeds and other growth at the ground surface and cultivating the soil by breaking up and mulching the same. As is well known by those versed in the gardening art, a common type of conventional hoe has a handle mounting a fixed blade at its lower end. The blade is located in a transverse plane of and projects beyond the normally under side of the handle in such a way that the hoe may be used to both cut weeds and the like and cultivate the soil. These existing hoes, however, are deficient in that both of their weed cutting and cultivating actions require alternate raising and lowering of the implements in a chopping motion which is very tiring.

Other types of weed cutting and cultivating implements have been devised, such as those disclosed in U.S. Pat. Nos. 602,425, 1,070,766, and 1,210,100. However, these implements are also difficult to use and do not operate effectively as both weed cutters and cultivators.

SUMMARY OF THE INVENTION

The improved dual action gardening implement of the invention is a combined weed cutter and cultivator having a handle mounting at its lower end a pair of front and rear blades with front and rear cutting edges, respectively. The blades are located in planes inclined at an oblique angle to the longitudinal axes of the handle and substantially perpendicular to a common plane containing the longitudinal axes of the handle. In use, the handle is held in an inclined position relative to the ground surface with the blades resting on the ground and the blades are moved back and forth across the surface to cut weeds and the like on both the front and back strokes.

At least the rear blade of the implement is pivotally mounted on the handle on an axis forwardly of the rear blade edge and substantially perpendicular to the common plane of the handle. The rear cutting edge of the rear blade is thus swingable vertically to ride on the ground surface during forward strokes of the implement and dig into the ground on the back strokes, thereby to cultivate the ground. Adjustment screws are provided for limiting the rocking angle of the rear blade and securing the rear blade against rocking in a selected angular position for optimizing the weed cutting and cultivating actions of the rear blade.

Two forms of the invention are disclosed. In one form, the front blade is fixed and the rear blade pivots. In the seconf form, the front and rear blades are rigidly joined to pivot in unison on a common pivot axis.

BRIEF DESCRIPTION OF THE DRAWINGS

FIG. 1 is a perspective view of a dual action gardening implement according to the invention;

FIG. 2 is an enlarged side elevation of the lower end of the implement;

FIG. 3 is a section taken on line 3—3 in FIG. 2; and

FIG. 4 is a side elevation of the lower end of a modified gardening implement.

DESCRIPTION OF THE PREFERRED EMBODIMENT

The gardening implement 10 illustrated in FIGS. 1–3 of the drawings has a handle 12 with an upper end 14 which is curved to facilitate gripping the handle and an opposite lower end. At the lower end of the handle are a front blade 16 and a rear blade 18 attached to a blade mounting bracket 20 rigid on the handle.

Mounting bracket 20 has a tongue 22 fitted within a socket 24 which extends upwardly through the handle from its lower end. The tongue is secured in the socket by a screw 26. Rigid on the lower end of the tongue is the bracket body 28 having an enlarged upper portion 30 providing a rear shoulder 32 for seating against the lower end of the handle. Depending from the rear end of the body portion 30 is a rear bracket arm 34. A front bracket arm 36 extends downwardly from the front end of the bracket portion 30 and then forwardly to form a foot 38. The under surface 40 of this foot is located in a plane inclined at an oblique angle to the longitudinal axes of the handle 12 and disposed perpendicular to a given plane containing the handle axes. As will appear presently, in normal use of the implement, the handle is held in an inclined position (FIG. 1) such that the given handle plane is generally vertical. In the ensuing description, this handle plane is referred to as the vertical plane of the handle.

The front blade 16 has a front cutting edge 42 and seats flat against the under surface 40 of the front bracket foot 38. The blade is welded or otherwise rigidly joined to the foot and is thereby located in a plane normal to the vertical handle plane. As shown, the blade is oriented so that its cutting edge 42 is also perpendicular to the vertical handle plane, although the edge may be inclined at an oblique angle to the latter plane.

Welded or otherwise rigidly joined to the rear blade 18 adjacent its front edge and midway between its ends is an upstanding bifurcated arm 44. This arm straddles and is attached by a pivot 46 to the blade mounting bracket 20 between the bracket arms 34, 36. The rear blade is thereby pivoted on the bracket for rocking on a pivot axis normal to the vertical handle plane. Along the rear side of the rear blade is a cutting edge 48 normal to the vertical handle plane. As shown in FIG. 2, the rear blade is swingable upwardly through a position in the plane of the front blade 16 and downwardly to a position wherein the rear blade is inclined downwardly relative to and has its rear cutting edge 48 located below the plane of the front blade.

Set screws 50 and 52 are threaded in the bracket arms 34, 36 for engagement with the rear blade arm 44. Screws 50, 52 may be adjusted to limit the rocking angle of the rear blade 18 as well as secure the blade against rocking in any selected angular position.

In use of the gardening implement, with the rear blade 18 released to rock through a small angle as shown in FIG. 2, the blades 16, 18 are placed flat on the ground, and the handle 12 is alternately pushed and pulled to move the blades back and forth across the ground. On the front stroke, the front blade 16 slices through weeds and other growth engaged by its cutting edge 42. The rear blade 18 swings upwardly to ride flat on the ground behind the rear blade. On the back stroke, the rear blade swings down to cut into and cultivate the soil. The front blade may have openings 54 for mulching the soil loosened by the rear blade. If desired, the rear blade 16 may be fixed in its upper full line position of FIG. 2 to slice through weeds on the back stroke in the same manner as the front blade on the front stroke.

The modified gardening implement 100 of FIG. 4 has a handle 102 like the handle 12. Fixed in the lower end of the handle is a blade mounting bracket 104 having spaced depending arms 106, 108. The implement has front and rear blades 110, 112 rigidly and integrally joined by a downwardly arching midsection 114. Welded or otherwise rigidly joined to this midsection is an upstanding arm 116. The upper end of this arm straddles and is attached by a pivot 118 to the bracket 104 between the bracket arms 106, 108. The axis of this pivot is normal to the vertical plane of the handle 102. The cutting blades 110, 112 are located in a common plane normal to the handle plane and have front and rear cutting edges 120, 122.

Threaded in the bracket arms 106, 108 are set screws 124, 126 which are engagable with the upstanding blade arm 116. Screws 124, 126 may be set to limit the rocking angle of the blades 110, 112 and to secure the blades against rocking in a selected angular position. Blades 110, 112 have soil mulching openings 128.

In use of the modified gardening implement, the blades 110, 112 are moved back and forth across the ground. The set screws 124, 126 are set to allow the blades to rock through a small angle such that on the front stroke the front blade 110 slices through weeds and the like. Depending upon the setting of the front set screw 124, the front blade may also dig into the ground. On the back stroke, the rear blade slices through weeds and also swings down to dig into the soil as before. In this regard, the angle A in FIG. 4 is very important in that it gives a positive push forward and positive engagement and positive action on pulling back for a reverse cut before the blades tilt over center.

In both forms of the implement, the adjustment set screws permit adjustment of the rocking angle of the rear blade to regulate its depth of cut into the soil on the back stroke. The screws have jaw nuts as shown to retain the screws in their adjusted settings. The soil mulching action of the implements is improved by increasing the angle and hence depth of cut of the rear blade.

The inventor claims:

1. A dual action gardening implement comprising:
a handle having normally upper and lower ends,
relatively broad, flat front and rear blades at the lower end of said handle located in planes inclined at an oblique angle to the longitudinal axis of the handle and substantially perpendicular to a common plane containing said axis,
said front and rear blades having front and rear cutting edges, respectively, and
means mounting said blades on said handle for rocking of at least said rear blade on a pivot axis substantially perpendicular to said common plane and located forwardly of said rear blade edge in a manner such that said blades may be moved back and forth across the ground surface with said blades substantially in a common plane to cut weeds and the like at the ground surface and the rear blade may swing down to dig into the ground during each back stroke and swing up to ride on the ground surface during each front stroke.

2. A gardening implement according to claim 1 wherein:
said blades are rigidly joined to one another with said blades disposed substantially in a common plane to rock in unison on said pivot axis.

3. A gardening implement according to claim 1 wherein:
said front blade is rigidly fixed to said handle and said rear blade is rockable through a position wherein said blades are located in a common plane.

4. A gardening implement according to Claim 1 including:
adjustable stop means for adjustably limiting the rocking angle of said rear blade and securing the rear blade against rocking motion in a selected angular position.

5. A gardening implement according to claim 4 wherein:
said stop means comprises a first adjustment screw for limiting upward swinging of said rear blade and a second adjustment screw for limiting downward swinging of said rear blade.

6. A gardening implement according to Claim 1 wherein:
said front blade has mulching openings.

7. A gardening implement according to claim 1 wherein:
said blade mounting means comprises a blade mounting bracket fixed to said handle, said front blade being rigidly joined to said bracket, and an arm rigidly joined to and rising from said rear blade and pivotally attached to said bracket.

8. A gardening implement according to claim 7 including:
adjustment screws threaded in said bracket at the front and rear of said arm and engagable with said arm to adjustably limit rocking of said rear blade and secure said rear blade against rocking in a selected angular position.

9. A gardening implement according to Claim 1 wherein:
said blades are rigidly joined to one another with the blades disposed in a common plane to rock in unison on said pivot axis, and
said blade mounting means comprises a blade mounting bracket fixed to said handle and an arm fixed to and rising from said blades between their cutting edges and pivoted on said bracket.

10. A gardening implement according to claim 9 including:
adjustment screws threaded in said bracket at the front and rear of said arm and engagable with said arm to adjustably limit rocking said blades and secure said blades against rocking in a selected angular position.

11. A gardening implement according to claim 10 wherein:
said blades have a rounded hump at their underside between their cutting edges.

* * * * *